United States Patent
Favre et al.

(10) Patent No.: US 10,176,444 B2
(45) Date of Patent: Jan. 8, 2019

(54) COMPUTER-IMPLEMENTED METHOD, COMPUTER PROGRAM PRODUCT AND SYSTEM FOR ANALYZING A CONTROL-FLOW IN A BUSINESS PROCESS MODEL

(75) Inventors: Cedric Favre, Rueschlikon (CH); Hagen Voelzer, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 1066 days.

(21) Appl. No.: 13/700,643

(22) PCT Filed: May 25, 2011

(86) PCT No.: PCT/IB2011/052266
§ 371 (c)(1),
(2), (4) Date: Nov. 28, 2012

(87) PCT Pub. No.: WO2011/148319
PCT Pub. Date: Dec. 1, 2011

(65) Prior Publication Data
US 2013/0073334 A1 Mar. 21, 2013

(30) Foreign Application Priority Data
May 28, 2010 (EP) ..................... 10164396

(51) Int. Cl.
*G06Q 10/06* (2012.01)
*G06Q 10/04* (2012.01)
(Continued)

(52) U.S. Cl.
CPC ......... *G06Q 10/0633* (2013.01); *G06Q 10/04* (2013.01); *G06T 11/206* (2013.01); *G06F 3/04845* (2013.01); *G06T 2200/24* (2013.01)

(58) Field of Classification Search
CPC ......... G06Q 10/00; G06Q 40/06; G06F 17/60
(Continued)

(56) References Cited

U.S. PATENT DOCUMENTS 6,038,538 A 3/2000 Agrawal et al.
7,024,669 B1* 4/2006 Leymann et al. ............ 718/100
(Continued)

OTHER PUBLICATIONS

Desel, J., et al. "Free Choice Petri News" Cambridge Tracts in Theoretical Computer Science 40. Copyrighted 1995. (256 Pages).
(Continued)

*Primary Examiner* — Romain Jeanty
(74) *Attorney, Agent, or Firm* — Tutunjian & Bitetto, P.C.; Jennifer R. Davis (57) ABSTRACT

A new technique to analyze the control-flow, i.e., the workflow graph of a business process model, which is called symbolic execution, is provided. Acyclic workflow graphs that may contain inclusive OR-gateways are considered; a symbolic execution for them is defined, which runs in quadratic time. In particular, this symbolic execution essentially comprises labeling edges of nodes of the graph such that a label assigned to a first edge comprises a set of one or more edge identifiers, each identifying a second edge that is an outgoing edge of an XOR-split or an IOR-split node in the graph, whereby executing the second edge ensures that the first edge will be executed. Such a scheme may permit a decision for any pair of control-flow edges or tasks of the workflow graph whether they are sometimes, never, or always reached concurrently. This has different applications in finding control- and data-flow errors.

13 Claims, 4 Drawing Sheets

(51) Int. Cl.
*G06T 11/20* (2006.01)
*G06F 3/0484* (2013.01)

(58) Field of Classification Search
USPC .................................................. 705/7.27
See application file for complete search history.

(56) References Cited

U.S. PATENT DOCUMENTS

| | | | |
|---|---|---|---|
| 8,171,226 B2* | 5/2012 | Chang et al. | 711/133 |
| 2005/0038764 A1 | 2/2005 | Minsky et al. | |
| 2010/0153152 A1 | 6/2010 | Kind | |
| 2012/0330703 A1* | 12/2012 | Hohmann | G06Q 10/10 705/7.11 |
| 2013/0152090 A1 | 6/2013 | Balko | |

OTHER PUBLICATIONS

Esparza, J. "Reduction and Synthesis of Live and Bounded Free Choice Petri Nets" Information and Computation, vol. 114, No. 1. Oct. 1994. pp. 50-87.

Fahland, D., et al. "Instantaneous Soundness Checking of Industrial Business Process Models" BPM 09 Proceedings of the 7th International Conference on Business Process Management. Sep. 2009. pp. 278-293.

Farve, C. "An Efficient Approach to Detect Lack of Synchronization in Acyclic Workflow Graphs" 2nd Central-European Workshop on Services and their Composition, und ihre Komposition, ZEUS 2010. Feb. 2010. pp. 57-64.

Goldberg, A., et al. "A New Approach to the Maximum-Flow Problem" Journal of the Association for Computing Machinery, vol. 35, No. 4. Oct. 1998. pp. 921-940.

Mendling, J. "Detection and Prediction of Errors in EPC Business Process Models" Dissertation submitted for the Institute of Information Systems and New Media—Vienna University of Economics and Business Administration. May 2007. (525 Pages).

Mendling, J. "Empirical Studies in Process Model Verification" Transactions on Petri Nets and Other Models of Concurrency II, Special Issue on Concurrency in Process-Aware Information Systems, vol. 2. May 2009. pp. 208-224.

Perl, Y., et al. "Finding Two Disjoint Paths Between Two Pairs of Vertices in a Graph" Journal of the Association for Computing Machinery, vol. 25, No. 1. Jan. 1978. pp. 1-9.

Sadiq, W., et al. "Analyzing Process Models Using Graph Reduction Techniques" Information Systems, vol. 25, Issue 2. Apr. 2000. pp. 117-134.

Van Der Aalst, W. "Workflow Verification: Finding Control-Flow Errors Using Petri-Net-Based Techniques" Business Process Management, LNCS. Jan. 2000. pp. 161-183.

Volzer, H. "A New Semantics for the Inclusive Converging Gateway in Safe Processes" BPM'10 Proceedings of the 8th International Conference on Business Process Management. Sep. 2010. pp. 294-309.

Weidlich, M., et al. "Computation of Behavioural Profiles of Processes Models" Technical report, BPT Technical Report. Aug. 2009. (11 Pages).

Weidlich, M., et al. "Efficient Computation of Causal Behavioural Profiles Using Structural Decomposition" Applications and Theory of Petri Nets, Lecture Notes in Computer Science, vol. 6128. Jun. 2010. pp. 63-83.

Wynn, M., et al. "Business Process Verification—Finally a Reality!" Business Process Management Journal, vol. 15, No. 1. Feb. 2009. pp. 74-92.

Boerger et al., "On defining behavior of OR-joins in Business Process Models" Journal of Universal Computer Science, vol. 14, No. 1 (2009), pp. 3-32.

Lohmann, "Correcting Deadlocking Service Choreographies using a Simulation-Based Graph Edit Distance", BPM 2008, Springer-Verlag, Berlin Heidelberg, 2008, pp. 132-147.

Vanhatalo et al., "The Refined Process Structure Tree" BPM 2008, Springer-Verlag, Berlin Heidelberg, 2008, pp. 100-115.

Office Action issued by the U.S. Patent and Trademark Office for U.S. Appl. No. 13/755,949, dated May 20, 2013. (16 pages).

Farve, C., et al. "Computer-Implemented Method, Computer Program Product and System for Analyzing a Control-Flow in a Business Process Model". Final Office Action for U.S. Appl. No. 13/755,949, dated Nov. 15, 2013. (18 Pages).

European Patent Office. "Notice from the European Patent Office dated Oct. 1, 2007 concerning business methods", Official Journal of the European Patent Office, vol. 30, No. 11. Nov. 2007. pp. 592-593.

* cited by examiner

COMPUTER-IMPLEMENTED METHOD, COMPUTER PROGRAM PRODUCT AND SYSTEM FOR ANALYZING A CONTROL-FLOW IN A BUSINESS PROCESS MODEL

FIELD OF THE INVENTION

The invention relates to the field of method for analyzing a control-flow in a business process model. In particular, it relates to methods for assisting a user in the detection of control- and data-flow errors.

BACKGROUND OF THE INVENTION

Business process models are known. A business process model is a model defining order dependencies of constituent activities of a business process. With the increased use of business process models in simulation, code generation and direct execution, it becomes more and more important that the processes are free of control- and data-flow errors. Various studies (see [1] for a survey) have shown that such errors frequently occur in processes.

It can be realized that some of these errors can be characterized in terms of relationships between control-flow edges or tasks of the process. For example, a process is free of deadlock if any two incoming edges of an AND-join are always marked concurrently. We can say that such a pair of edges is always concurrent. A process is free of lack of synchronization if any two incoming edges of an XOR-join are mutually exclusive, i.e., they never get marked concurrently. A data-flow hazard may arise if two conflicting operations on the same data object are executed concurrently. That can happen only if the tasks containing the data operations are sometimes concurrent, i.e., not mutually exclusive. Similar relationships have also been proposed for a behavioral comparison of processes [2, 3].

Such control-flow relations can be computed by enumerating all reachable control-flow states of the process by explicitly executing its workflow graph, i.e., its control-flow representation. However, there can be exponentially many such states, resulting in a worst-case exponential time algorithm.

Some existing techniques can decide soundness of a workflow graph without IOR gateways, or equivalently a Free Choice Petri net, in polynomial time: a technique based on the rank theorem [4] in cubic time and techniques based on a complete reduction calculus [5] in more than cubic time. However, diagnostic information is not provided by the former technique and was not yet worked out for the latter.

Techniques based on state space exploration return an error trace, i.e., an execution that exhibits the control-flow error, but they have exponential worst-case time complexity. It has been shown [6] for industrial processes without IOR gateways that the latter problem can be effectively addressed in practice using various reduction techniques. Various additional structural reduction techniques exist in the literature, e.g., [7, 8].

Wynn et al. [9] provide a study of verifying processes with IOR gateways. They apply state space exploration and use a different IOR-join semantics.

To the best of their knowledge, the present inventors are not aware of approaches that provide diagnostic information to deal with the over-approximation due to data abstraction in workflow graphs. Existing approaches to check other notions of soundness such as relaxed soundness [10] or weak soundness [11] have exponential complexity.

BRIEF SUMMARY OF THE INVENTION

According to one aspect thereof, the present invention is embodied as a computer-implemented method for analyzing a control-flow in a business process; the method comprising the steps of: invoking a representation of the business process as an acyclic workflow graph containing AND-, XOR- and IOR-types of nodes and edges linking nodes of the graph; labeling edges of the graph such that a label assigned to a first edge comprises a set of one or more edge identifiers identifying respective edges, each of the edges identified being an outgoing edge of an XOR-split or an IOR-split node in the graph, whereby executing any one of the identified edges ensures that the first edge will be executed; and checking the labels for a deadlock, while labeling.

In embodiments, the method may comprise one or more of the following features:

- the graph has a unique source edge with a predefined label comprising a unique edge identifier identifying the source edge, and labeling is initiated from the source edge;
- the step of labeling further comprises propagating the labeling by labeling outgoing edges of the nodes of the graph with respective outgoing labels according to incoming labels of respective incoming edges of the nodes;
- at the step of labeling, a label of an outgoing edge of an XOR-split node or an IOR-split node of the graph contains only one edge identifier of the said outgoing edge;
- the step of labeling is performed by applying, for each node, a propagation function in accordance with the type of the said each node;
- the step of labeling is further performed such that: if the graph is deadlock free, then two labels of respective two incoming edges of an AND-join node of the graph are equivalent; and if two labels of respective two incoming edges of an AND-join node of the graph are non-equivalent, then the graph has a deadlock, and the step of checking further comprises checking the incoming labels of the AND-join node for a deadlock;
- the method further comprises a step of: if a deadlock is detected at the step of checking, returning to a user a characterization indicative of the detected deadlock via a graphical user interface or GUI;
- the method further comprises, after returning the characterization indicative of the detected deadlock, a step of: upon receiving user instruction to dismiss a detected deadlock, continuing the labeling by considering: the labels of respective two incoming edges of the AND-join node corresponding to the detected deadlock as equivalent; and the AND-join node corresponding to the detected deadlock as an inclusive OR-join node;
- the characterization indicative of the detected deadlock is returned to the user by graphically identifying in the GUI the AND-join node corresponding to the detected deadlock, two incoming edges thereof and their respective labels;
- the acyclic workflow graph and the labels of the edges as obtained during the labeling step are graphically represented in the GUI;

the method further comprises, prior to labeling, a step of detecting a lack of synchronization in the acyclic workflow graph;

the step of labeling is performed based on a maximum prefix of the acyclic workflow graph that does not contain a lack of synchronization; and labeling is performed by a single traversal of the graph.

According to another aspect, the present invention is embodied as a computer program residing on a computer-readable medium, comprising instructions for causing a computer system to implement each of the steps of the method according to the invention.

According to yet another aspect, the present invention is embodied as a computer system, comprising one or more processors and a memory, operatively interconnected to one another and configured to implement each of the steps of the method according to the invention.

DETAILED DESCRIPTION OF THE INVENTION

As an introduction to the following description, it is first pointed at general aspects of the invention, directed to a method for analyzing a control-flow in a business process. In particular, it is first invoked a representation of the business process as an acyclic workflow graph containing AND-, XOR- and IOR-types of nodes. Then, a form of symbolic execution of the workflow graph is proposed, which essentially comprises labeling edges of the nodes such that a label assigned to a first, given edge comprises a set of edge identifiers. Such identifiers are later referred to as "outcomes". Here, each identifier identifies a respective edge, which is an outgoing edge of an XOR-split or an IOR-split node. By construction, this labeling process is ordered such as to ensure that executing one of the identified edges ensures that the first edge will be executed. In addition, labels are checked for a deadlock during the labeling process (the checking process may for instance be interlaced within the labeling process).

The labeling may for instance be performed by a single traversal of the graph. It may e.g. be performed such that if two labels of respective two incoming edges of an AND-join are non-equivalent, then the graph has a deadlock.

The above scheme results in a control-flow analysis, which may decide absence of deadlock in the graph, with reduced computational resources compared to other known schemes (e.g. quadratic vs. exponential time). Eventually, and as to be discussed later, soundness can be decided as well, that is, the absence of deadlock and lack of synchronization in the graph.

While several actual implementations can be contemplated, a very convenient one is to propagate the labeling from a unique source edge of the graph, with a predefined label assigned thereto, and comprising a unique edge identifier that identifies the source edge itself. Other schemes may propagate labels from any node.

Then, the labeling process is further propagated to other nodes. In general, outgoing edges of the nodes shall be labeled with respective outgoing labels and this, according to incoming labels of respective incoming edges of the nodes. As discussed later in details, there are however exceptions, notably when an XOR-split or an IOR-split is involved.

It remains that a local mechanism can be involved, which requires limited computational resources only. To this aim, a "local" propagation function may be applied when propagating the labels on either sides of a node, in accordance with the type thereof.

Accordingly, acyclic workflow graphs are considered that may contain inclusive OR (IOR) gateways; and a symbolic execution of such graphs is defined, which, in embodiments, runs in quadratic time. It may for instance capture enough information to allow for deciding, using e.g. a complementing graph analysis technique, relationships for any pair of control-flow edges, and this, in quadratic time. Thus, a control-flow analysis is obtained, which may decide soundness in quadratic time and for any acyclic graph that possibly contain IOR gateways.

By construction, the symbolic execution keeps track of which identifiers, i.e., decision outcomes, within the process flow lead to which edge being marked. Therefore, it can provide information, in case of a detected error, about which decisions potentially lead to the error. It shall later be shown how this can lead to more compact diagnostic information than obtained with prior techniques. In particular, it is illustrated how this allows the user to efficiently deal with spurious errors that arise due to over-approximation of the data-based decisions in the process.

1 ORGANIZATION OF THE DETAILED DESCRIPTION

The present specification is structured as follows: after setting preliminary notions, the symbolic execution is introduced in Sect. 3. How the relationship 'always concurrent' and the absence of deadlock can be decided is furthermore illustrated. Then, for completeness, the 'sometimes concurrent' and 'mutually exclusive' relationships and lack of synchronization are discussed in Sect. 4. Sect. 5 shows how the diagnostic information provided by symbolic execution can be used to deal with the over-approximation that results from abstracting from data-based decisions. Reference is made to other works throughout; they are listed at the end of the description.

2 PRELIMINARIES

In this section, preliminary notions are defined, which include workflow graphs and their soundness property.

2.1 Basic Notions

Let U be a set. A multi-set over U is a mapping m: U→$\mathbb{N}$. Use is here made of the notation m[e] instead of m(e). For two multi-sets $m_1$, $m_2$, and each x∈U, we have: $(m_1+m_2)[x]=m_1[x]+m_2[x]$ and $(m_1-m_2)[x]=m_1[x]-m_2[x]$. The scalar product is defined by $m_1 \otimes m_2=\Sigma_{x \in U} m_1[x] \times m_2[x]$. By abuse of notation, we sometimes use a set X⊆U in a multi-set context by setting X[x]=1 if and only if x∈X and X[x]=0 otherwise.

A directed graph G=(N, E) consists of a set N of nodes and a set E of ordered pairs (s, t) of nodes, written s→t. A directed multi-graph G=(N, E, c) consists of a set N of nodes, a set E of edges and a mapping c: E→(N∪{null})×(N∪{null}) that maps each edge to an ordered pair of nodes or null values. If c maps e∈E to an ordered pair (s, t)∈N, then s is called the source of e, t is called the target of e, e is an outgoing edge of s, and e is an incoming edge of t. If s=null, then we say that e has no source. If t=null, then we say that e has no target. For a node n∈N, the set of incoming edges of n is denoted by ○n. The set of outgoing edges of n is denoted n○. If n has only one incoming edge e, °n denotes e (○n would denote {e}). If n has only one outgoing edge e', n° denotes e'.

Next, a path $p=\langle x_0, \ldots, x_n \rangle$ from an element $x_0$ to an element $x_n$ in a graph G=(N, E, c) is an alternating sequence of elements $x_i$ in N and in E such that, for any element $x_i \in E$ with $c(x_i)=(s_i, t_i)$, if i≠0 then $s_i=x_{i-1}$ and if i≠n then $t_i=x_{i+1}$. If x is an element of a path p we say that p contains x. A path is trivial, when it is contains only one element. A cycle is a path $b=\langle x_0 \ldots x_n \rangle$ such that $x_0=x_n$ and b is not trivial.

2.2 Workflow Graphs

A workflow graph W=(N, E, c, l) consists of a multi-graph G=(N, E, c) and a mapping l: N→{AND, XOR, IOR} that associates a logic with every node n∈N, such that:

1. An edge with null as source is a source of the workflow graph and an edge with null as target is a sink of the workflow graph.
2. The workflow graph has one source, as evoked above, and at least one sink.
3. For each node n∈N, there exists a path from the source to one of the sinks that contains n. W is cyclic if there exists a cycle in W.

Figure 1:
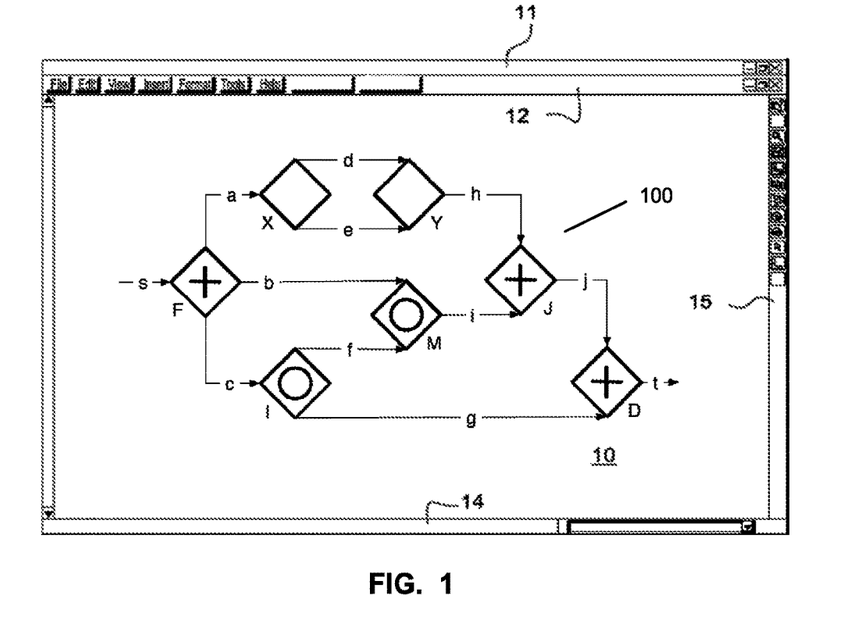
FIG. 1 shows a workflow graph, as displayed in a graphical user interface (GUI)

For example, FIG. 1 depicts an acyclic workflow graph 100. A diamond containing a plus symbol represents a node with AND logic, an empty diamond represents a node with XOR logic, and a diamond with a circle inside represents a node with IOR logic. A node with a single incoming edge and multiple outgoing edges is called a split. A node with multiple incoming edges and single outgoing edge is called a join. For the sake of simplicity, use is here made of workflow graphs comprising only splits and joins. This syntactic restriction is however not meant to reduce the expressiveness of workflow graphs as used in the present invention. The source of the workflow graph is labeled s and use is here made of workflow graphs with a unique sink labeled t.

Let, in the rest of this section, W=(N, E, c, l) be an acyclic graph. Let $x_1$, $x_2$ ∈ N∪E be two elements of W such that there is a path from $x_1$ to $x_2$. We then say that $x_1$ precedes $x_2$, denoted $x_1 < x_2$, and $x_2$ follows $x_1$. Two elements $x_1$, $x_2 \in$ N∪E of W are unrelated, denoted $x_1 \| x_2$, if and only if $x_1 \neq x_2$ and neither $x_1 < x_2$ nor $x_2 < x_1$. A prefix of W is a workflow graph W'=(N', E', c', l') such that N'⊆N, for each pair of nodes $n_1$, $n_2 \in$N, if $n_2 \in$N' and $n_1 < n_2$ then $n_1 \in$N', an edge e belongs to E' if and only if there exists a node n∈N' such that e is adjacent to n, for each node n∈N', we have l'(n)=l(n), and for each edge e∈E', we have c' (e)=(s', t'), c(e)=(s, t), s'=s, t'=t if t∈N', and t'=null otherwise.

The semantics of workflow graphs can for instance be defined as a token game, similarly to Petri nets. If n has AND logic, executing n removes one token from each of the incoming edges of n and adds one token to each of the outgoing edges of n. If n has XOR logic, executing n removes one token from one of the incoming edges of n and adds one token to one of the outgoing edges of n. If n has IOR logic, n can be executed if and only if at least one of its incoming edges is marked and there is no marked edge that precedes a non marked incoming edge of n. When n executes, it removes one token from each of its marked incoming edge and adds one token to a non-empty subset of its outgoing edges. This IOR-semantics is indicated in version 1.0 of the BPMN standard and complies with BPELs dead path elimination [12].

The outgoing edge or set of outgoing edges to which a token is added when executing a node with XOR or IOR logic is non-deterministic, by which we abstract from data-based or event-based decisions in the process.

Such a semantic is advantageously relied upon, in embodiments. It can be defined formally as discussed in the following. Other semantics could yet be contemplated.

A marking, m: E→$\mathbb{N}$, of a workflow graph with edges E is a multi-set over E. When m[e]=k, we say that the edge e is marked with k tokens in m. When m[e]>0, we say that the edge e is marked in m. The initial marking $m_s$ of W is such that the source edge s is marked with one token in $m_s$ and no edge, other than s, is marked in $m_s$.

Let m and m' be two markings of W. A tuple $(E_1, n, E_2)$ is called transition if n ∈N $E_1$ ⊆ ○n, and $E_2$ ⊆ n○. A transition $(E_1, n, E_2)$ is enabled in a marking m if and only if for each edge e∈$E_1$ we have m[e]>0 and any of the following proposition:

l(n)=AND, $E_1$=○n, and $E_2$=n○.
l(n)=XOR, there exists an edge e such that $E_1$={e}, and there exists an edge e such that $E_2$={e'}.
l(n)=IOR, $E_1$, $E_2$ are not empty, $E_1$={e∈○n|m(e)>0}, and, for every edge e∈○n\ $E_1$, there exists no edge e', marked in m, such that e'<e.

A transition T can be executed in a marking m if and only if T is enabled in m. When T is executed in m, a marking m' results such that m'=m–$E_1$+$E_2$.

An execution sequence of W is an alternate sequence σ=$\langle m_0, T_0, m_1, T_1 \ldots \rangle$ of markings $m_i$ of W and transitions $T_i$=($E_i$, $n_i$, $E_i'$) such that, for each i≥0, $T_i$ is enabled in $m_i$ and $m_{i+1}$ results from the execution of $T_i$ in $m_i$. An execution of W is a non-empty execution sequence σ=$\langle m_0, \ldots, m_n \rangle$ of W such that $m_0$=$m_s$ and there is no transition enabled in $m_n$. As the transition between two markings can be easily deduced, we often omit the transitions when representing an execution or an execution sequence, i.e., we write them as sequence of markings.

Let m be a marking of W, m is reachable from a marking m' of W if and only if there exists an execution sequence σ=$\langle m_0, \ldots, m_1 \rangle$ of W such that $m_0$=m' and m=$m_n$. The marking m is a reachable marking of W if and only if m is reachable from $m_s$.

2.3 Soundness

A deadlock occurs when a token stays blocked on one edge of the workflow graph: A deadlock of W is a reachable marking m of W such that there exists a non sink edge e∈E that is marked in m and e is marked in all the markings reachable from m. We say that W contains a deadlock if and only if there exists a marking m of W such that m is a deadlock. For instance, the workflow graph of FIG. 1 allows the execution $\sigma = \langle [s], [a, b, c], [b, c, d], [b, c, h], [b, f, h], [h, i], [j] \rangle$. The marking [j] is a deadlock.

A lack of synchronization of W is a reachable marking m of W such that there exists an edge e∈E that is marked by more than one token in m. We say that a workflow graph W contains a lack of synchronization if and only if there exists a marking m of W such that m is a lack of synchronization.

A workflow graph is sound if and only if it contains neither a deadlock nor a lack of synchronization.

3 SYMBOLIC EXECUTION AND ALWAYS CONCURRENT EDGES

In this section, we introduce symbolic execution and show how we use it to detect deadlocks and determine whether two edges are always concurrent. We start with giving a characterization of deadlock then we introduce the symbols (i.e., the labels) and the propagation rules of the symbols. Finally, we show how to compute a normal form of a symbol and discuss the complexity of the proposed technique.

Let, in this section, W=(N, E, c, l) be an acyclic workflow graph that does not contain a lack of synchronization. We will see in Sect. 4 how we can additionally detect lack of synchronizations. However, note that if we are to analyze a workflow graph, we would preferably first detect lack of synchronization. Then we would perform symbolic execution on the maximum prefix of the workflow graph that does not contain a lack of synchronization.

3.1 Equivalence of Edges and a Characterization of Deadlock

A deadlock arises at an AND-join when one of its incoming edge is marked during an execution a but another does not get marked during σ. Thus, in order to have no deadlock, the incoming edges of an AND-join need to get marked together in each execution. We can for example capture this through edge equivalence or the notion always concurrent, as evoked above. To formalize these notions, we may define the Parikh vector of an execution, which records, for each edge, the number of tokens that are produced on that edge during the execution.

Definition 1 (Parikh vector).

The Parikh vector of an execution σ, written $\vec{\sigma}$, is the multi-set of edges such that $\vec{\sigma}[s]=1$ for the source s and otherwise $\vec{\sigma}[e]=k$, if and only if k is the number of occurrences of transitions $T_i=(E, n, E')$ in a such that e∈E'.

For example, given the execution $\sigma = \langle [s], (\{s\}, F, \{a, b, c\}), [a, b, c], (\{a\}, X, \{d\}), [b, c, d], (\{d\}, Y, [b, c, h], (\{c\}, I, \{f\}), [b, f, h](\{b, f\}, M, \{i\}), [h, i], (\{h, i\}, J, \{j\}), [j] \rangle$ of the workflow graph of FIG. 1, we have $\vec{\sigma}[s] = \vec{\sigma}[a] = \vec{\sigma}[b] = \vec{\sigma}[c] = \vec{\sigma}[d] = \vec{\sigma}[f] = \vec{\sigma}[h] = \vec{\sigma}[i] = \vec{\sigma}[j] = 1$ and $\vec{\sigma}[e] = \vec{\sigma}[g] = 0$.

Additional definition and propositions shall help in further formalizing notions evoked earlier.

Definition 2 (Edge Equivalence, Always Concurrent).

Two edges are parallel in an execution σ if and only if there is a state in σ in which both edges are marked. Two executions σ, σ are interleaving equivalent if and only if $\vec{\sigma} = \vec{\sigma}'$. Two edges are concurrent in a if and only if there is an execution σ' such that σ and σ' are interleaving equivalent and the edges are parallel in σ'. Two edges are always concurrent if and only if they are concurrent in every execution of W.

Two edges $e_1$ and $e_2$ of W are equivalent, written $e_1 \equiv e_2$, if and only if for any execution a of W, we have $\vec{\sigma}[e_1] = \vec{\sigma}[e_2]$.

Two executions that are interleaving equivalent execute the same transitions; they only differ in the order of concurrent events. Always concurrent edges and edge equivalence are tightly related in acyclic graphs:

Proposition 1.

Two edges $e_1$, $e_2$ are always concurrent if and only if $e_1 \equiv e_2$ and $e_1 \vee e_2$.

In the workflow graph depicted by FIG. 1, we have a≡b≡h and a is not equivalent to d, d not equivalent to g. Note that we have discussed earlier an execution of the workflow graph of FIG. 1 where $\vec{\sigma}[a] \neq \vec{\sigma}[d]$. However, there exists other executions such that $\vec{\sigma}[a] \neq \vec{\sigma}[d]$ and therefore a is not equivalent to d. Moreover, a is always concurrent to b but not to h. The edges j and g are not always concurrent. Therefore, we get a deadlock at the AND-join D.

Proposition 2.

W contains a deadlock if and only if there are two incoming edges of an AND-join of W that are not equivalent, or equivalently, that are not always concurrent.

In the following, we show how we can compute edge equivalence, in an embodiment, and therefore also whether two edges are always concurrent.

3.2 Symbolic Execution

A first step to compute edge equivalence is the symbolic execution of the workflow graph. During the symbolic execution, the edge labeling process is performed such that a label assigned to a first edge comprises outcomes (i.e., edge identifiers), each of the outcomes identifying a respective edge (call it a "second edge"), which by construction is an outgoing edge of an XOR-split or an IOR-split. As recited earlier, executing the second edge accordingly ensures that the first edge will be executed.

Also, the labeling is preferably propagated from the source, and outgoing edges of a given node are labeled according to the labels of incoming edges, e.g. by applying a suitable propagation function. The propagation function depends on the type of the node, i.e., what function to apply is thus typically chosen, at execution, amongst a set of functions and this, according to the AND-, XOR- or IOR-types of nodes. The process is further designed such as to allow for concluding that the graph contains a deadlock if the labels of incoming edges of an AND-join are not equivalent. Conversely, if the flow graph is deadlock-free then two incoming edges of any AND-join node have an equivalent label. Accordingly, checking labels of the edges of the graph allows for detecting a possible deadlock.

Examples of detailed implementations are discussed in the following, which for instance allow for nicely capturing the semantics described above.

Figure 2:
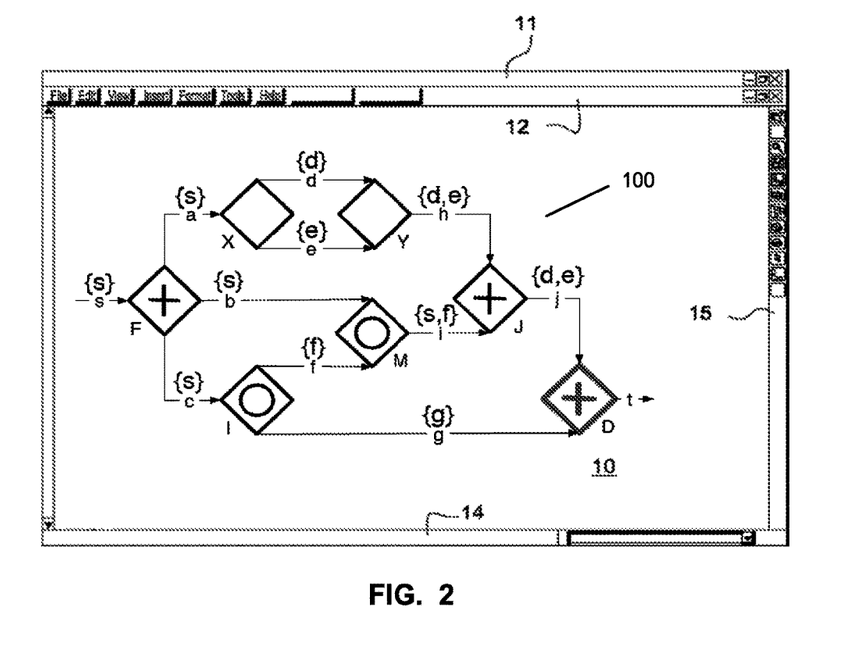
FIG. 2 depicts an example of assignment resulting from a symbolic execution of the workflow graph of FIG. 1, according to an embodiment of the invention.

As said, during the symbolic execution, each edge is labeled with a symbol, which is a set of identifiers or outcomes of the workflow graph. An outcome identifies an outgoing edge of an XOR-split or IOR-split in the graph. By abuse of language, we may say that an outcome is such an outgoing edge. For example, FIG. 2 shows the labeling of the workflow graph 100 of FIG. 1 that results from its symbolic execution, in an embodiment. Here the outcomes are depicted as lower case letters in curly brackets, e.g. {s}, {c} or {d}, which refer to the edges that they identify.

Preferably, both the initial graph 100 and the labeled graph as shown in FIGS. 1 and 2 are graphically represented to a user, through a suitable graphical user interface (GUI) 10. The GUI at stake may further allow for various interactions with the user, as to be discussed later. The exemplified GUI 10 may be a typical business process interface, having usual menu bars 11, 12, as well as bottom and side toolbars 14, 15. Such menu- and toolbars may contain a set of user-selectable icons, each associated with one or more operations or functions, as known in the art. Some of these icons are associated with software tools, adapted for editing and/or representing the graph 100 or parts thereof. Yet, in the remaining drawings, the GUI is not represented, for conciseness.

Figures 3, 3A, 3B, 3C, 3D, 3E, 3F:
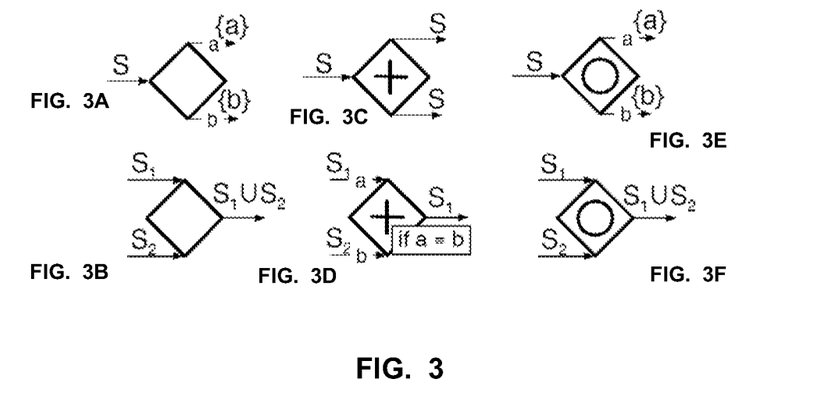
FIGS. 3A-F show typical propagation rules, i.e. propagation functions that may be invoked in embodiments of the invention.

As said, the symbolic execution preferably starts with labeling the source s with {s}. All other edges are yet unlabeled. If all incoming edges of a node are labeled, the outgoing edges of the node may be labeled by applying a suitable propagation rule (i.e. propagation function) such as represented in FIGS. 3A-F, and this, based on the logic of the node. For example, FIG. 3D represents the transition rule applied to an AND-join.

For example, in FIG. 2, the source s has a prefix label {s}, identifying the source itself. The same label is propagated to outgoing edges of the AND-split node F, according to the logic of the propagation function as depicted in FIG. 3C. Then, after node X (XOR-split), each label of the outgoing edges d, e of X contains only one outcome ({d} and {e}, respectively) its respective outgoing edge. Next, edge h is labeled with {d, e}, consistently with incoming edges of node Y, which has XOR-join logic and is accordingly handled according to the propagation function of FIG. 3B. Subsequent edge j, after AND-join node J, is labeled {d, e}, i.e., as one of the incoming edge of the node J, according to FIG. 3D. And so on. Incidentally, it can be noted that the propagation illustrated in FIG. 2 illustrates the fact that a label assigned to a first edge comprises a set of outcomes that each identifies a second edge, which is an outgoing edge of an XOR-split or an IOR-split node. Such a marking of the edges reflects the fact that executing the said "second edge" ensures that the said "first edge" will be executed.

The intuition behind this symbolic execution is to label an edge e with a set S of outcomes such that e is marked during an execution σ if and only if some of the outcomes in S get marked during σ. In general, the label of the outgoing edges depends on the labels of the incoming edges. For example, in case of an AND-join, labeling the outgoing edge depends on the label of one of the incoming edges, see FIG. 3D. However, if the node is an XOR-split or an IOR-split, then the symbol that is assigned to one of the outgoing edges only contains that outgoing edge. The symbol associated to the incoming edge of the node is then ignored. Now, in case the node is an AND-join, the propagation rule (see FIG. 3D) additionally requires the incoming edges to be equivalent in order to be applied. The AND-join rule then chooses one of the labels of the incoming edges (and thus is non-deterministic) as the label for the outgoing edge. Note that choosing either label actually works in practice.

The symbolic execution terminates when there is no propagation rule that can be applied.

In the following, we define the various propagation rules formally, according to a specific embodiment.

Definition 3 (Symbolic Execution).

An outcome of W is an outgoing edge of some XOR-split or IOR-split of W. A symbol of W is a set of outcomes of W. An assignment is a mapping φ that assigns a symbol to each edge of some prefix of W. If e is en edge of that prefix, we say that e is labeled under φ.

For every node n of a workflow graph, we describe the propagation by the node n from an assignment φ to an assignment φ', written $$\varphi \xrightarrow{n} \varphi'.$$

The propagation $$\varphi \xrightarrow{n} \varphi'$$

is activated when all the incoming edges of n are labeled under φ and all outgoing edges are not labeled under φ. Additionally, if n is an AND-Join, all the incoming edges of n must be equivalent for the propagation to be activated. Further we have $$\varphi \xrightarrow{n} \varphi'$$

only if:
- $l(n)$=AND and there exists an edge $e' \in {}^\circ n$ such that $\varphi'(e) = \varphi(e')$ if $e = e'$ and $\varphi'(e) = \varphi(e)$ otherwise.
- n is an XOR-split or an IOR-split and $\varphi'(e) = \{e\}$ if $e \in n^\circ$ and $\varphi'(e) = \varphi(e)$ otherwise.
- n is an XOR-join or an IOR-join and $\varphi'(e) = \bigcup_{e' \in {}^\circ n} \varphi(e')$ if $e \in n^\circ$ and $\varphi'(e) = \varphi(e)$ otherwise.

As said above, the propagation rules establish that an edge e is marked if and only if some of the outcomes in φ(e) is marked as well:

Lemma 1.

For any execution σ of W and any edge $e \in E$, $\vec{\sigma} \otimes \varphi(e) > 0 \Leftrightarrow \vec{\sigma}[e] > 0$.

3.3 A Normal Form for Symbols

To detect a deadlock or to label the outgoing edge of an AND-join, we need to check edge equivalence. For instance, if two incoming edges of an AND-join are not equivalent, we have found a deadlock.

We may exploit that the equivalence of edges corresponds to an equivalence of the symbols they are labeled with. In other words, if two labels of respective two incoming edges of an AND-join are different then the graph contains a deadlock.

Specifically, this symbol equivalence can be defined as follows:

Definition 4 (Symbol Equivalence).

Two symbols $S_1$, $S_2$ are equivalent with respect to W, written $S_1 = S_2$ if and only if, for any execution σ of W, $S_1 \otimes \vec{\sigma} = 0 \Leftrightarrow S_2 \otimes \vec{\sigma} = 0$.

As W is free of lack of synchronization, for any edge e and for any execution σ, we have $\vec{\sigma}[e] = 1$ or $\vec{\sigma}[e] = 0$. This given two edges $e_1$ and $e_2$ labeled under $\varphi$, the edges $e_1$ and $e_2$ are equivalent if and only if the symbols $\varphi(e_1)$ and $\varphi(e_2)$ are equivalent.

We will decide the equivalence of two symbols by computing a normal form for each of them. Two symbols are equivalent if and only if they have the same normal form. To show this, we define:

Definition 5 (Maximal Equivalent Extension, Closure).

Let $\varphi$ be an assignment of W, and e be an edge such that e is labeled under $\varphi$. Let O be the set of outcomes that are labeled under $\varphi$.

A maximal equivalent extension of $\varphi(e)$ with respect to $\varphi$ is a set $\varphi^*(e) \subseteq O$ such that $\varphi^*(e) \equiv \varphi(e)$ and there exist no other set $S \subseteq O$ such that $\varphi^*(e) \subsetneq S$ and $S \equiv \varphi(e)$.

The closure of $\varphi(e)$ with respect to $\varphi$ is the smallest set $\overline{\varphi}(e)$ such that $\varphi(e) \subseteq \overline{\varphi}(e)$ and for each XOR- or IOR-split n such that e' labeled under $\varphi$ for each $e' \in n\bigcirc$, we have $\varphi(\bigcirc n) \subseteq \overline{\varphi}(e)$ if and only if $n\bigcirc \subseteq \overline{\varphi}(e)$.

The existence of a maximal equivalent extension is clear. We can also show that it is unique.

Lemma 2.

Let $\varphi$ be an assignment of W and e an edge that is labeled under $\varphi$. Then $\varphi^*(e)$ is unique.

It is also clear that the closure exists and is unique. Moreover, we can prove:

Theorem 1.

Let $\varphi$ be an assignment of W. For every edge e that is labeled under $\varphi$, we have $\varphi^*(e) = \overline{\varphi}(e)$.

That is, we obtain a unique normal form that is equivalent with a given label of an edge. We show in Sect. 3.4 that the closure can be computed in linear time. Thus, from the characterization as a closure, we can compute the normal form in linear time. Moreover, the normal form has the desired property:

Theorem 2.

$\overline{\varphi}(e) = \overline{\varphi}(e')$ whenever $e \equiv e'$.

We are now able to compute the closure for the edges g, h, i, and j of our running example from FIG. 2. We have $\overline{\varphi}(g) = \{g\}$, $\overline{\varphi}(h) = \overline{\varphi}(i) = \overline{\varphi}(j) = \{s, d, e, f, g\}$. As $\overline{\varphi}(h) = \overline{\varphi}(i)$, h and i are equivalent. Thus, there is no deadlock at J. On the contrary, $\overline{\varphi}(g)$ differs from $\overline{\varphi}(j)$ which implies that g and j are not equivalent. Therefore, we detect a deadlock located on D.

Figure 4:
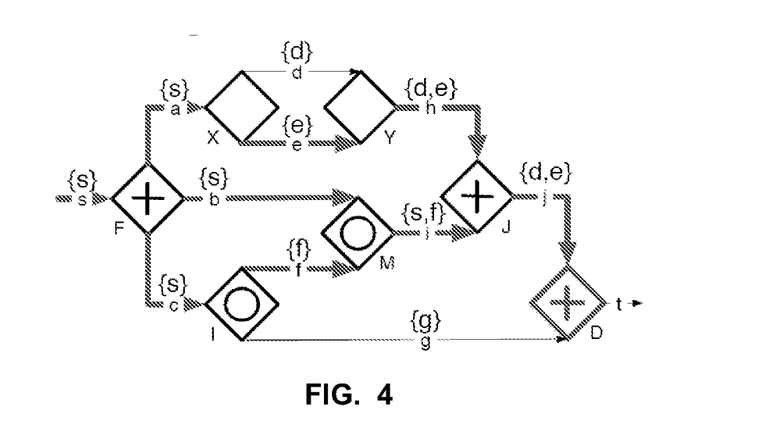
FIG. 4 illustrates a display of a deadlock, as to be graphically represented to a user, in an embodiment.

When we detect a deadlock because two incoming edges of an AND-join are not equivalent, we can say that the AND-join is the location of the deadlock. To display the deadlock we can, based on the assignment, generate in linear time an execution, called error trace, that exhibits the deadlock, mind the arrows and symbols in bold. As error display we can highlight the error trace and the location of the deadlock. FIG. 4 depicts an example of how the deadlock of the running example could be displayed. We discuss in Sect. 5 a form of diagnostic information and user interaction that goes beyond this error trace.

3.4 Complexity

In this section, we discuss the complexity of symbolic execution. We start with the complexity of computing the closure.

Let $\varphi$ be an assignment of W and D be the of IOR-splits and XOR-splits of W such that, for every node $d \in D$, every edge in $d\bigcirc$ is labeled under $\varphi$. To compute the closure, we only use the nodes in D. The closure of $\varphi(e)$ with respect to $\varphi$ is computed by increasing the symbol according to the condition that for every node $d \in D$, we have $\varphi(\bigcirc d) \subseteq \overline{\varphi}(e)$ if and only if $d\bigcirc \subseteq \overline{\varphi}(e)$. We define a closure operation of a node $d \in D$ on a symbol S that changes S to a symbol S' such that $S' = S \cup \varphi(\bigcirc d) \cup d\bigcirc$. The closure operation of d on S to S' is left enabled if and only if $\varphi(\bigcirc d) \subseteq S$ and $S' \neq S$. It is right enabled if and only if $d\bigcirc \subseteq S$ and $S' \neq S$. We can execute a closure operation if and only if it is left or right enabled.

After executing the closure operation of d on S to S, S contains the content of all symbols assigned to the edges adjacent to d. Thus, a closure operation of d cannot be enabled anymore. Therefore, each node in D is used at most once to compute the closure.

The computation of the closure may comprise two phases, at least in an embodiment:

We go through the nodes from the maximal to the minimal element in D with respect to the precedence relation <, i.e., from the right most nodes in the graph to the left most nodes of the graph. For each node n, we execute the closure operation of n if it is right enabled.

We go through the nodes from the minimal to the maximal element in D with respect to the precedence relation <. For each node n, we execute the closure operation of n if it is left enabled.

In this case, we have to ensure that after the two phases there is no more closure operation that is enabled: A right enabled closure operation of $d \in D$ on S to S' cannot right enable a closure operation of a node $d' \in D$ such that d' follows d because a right enabled closure operation of d only adds to the symbol outcomes that precede d. Similarly, a left enabled closure operation of $d \in D$ on S to S' only adds outcomes that follow d. Thus, it cannot right enable a closure operation of a node that precedes d. Finally, we have to argue that whenever we perform a closure operation in phase 2, we do not right enable a closure operation. We show this by contradiction: Suppose that in phase 2, we perform a left enabled closure operation of d on S to S' such that there exists a node $d' \in D$ and there is a closure operation of d' that is right enabled on S' and that is not right enabled on S. For a left enabled closure operation, we have $S' = S \cup d\bigcirc$. Thus, only the closure operation of d can be right enabled on S' but not on S and thus d'=d. However, we already performed the closure operation of d.

Therefore, we compute the closure of a symbol in linear time with respect to the size of D. Since in the present embodiment, symbolic execution just needs one traversal of the workflow graph, where each step takes at most linear time, the overall worst-case time complexity is quadratic.

4 LACK OF SYNCHRONIZATION AND SOMETIMES CONCURRENT EDGES

Figure 5:
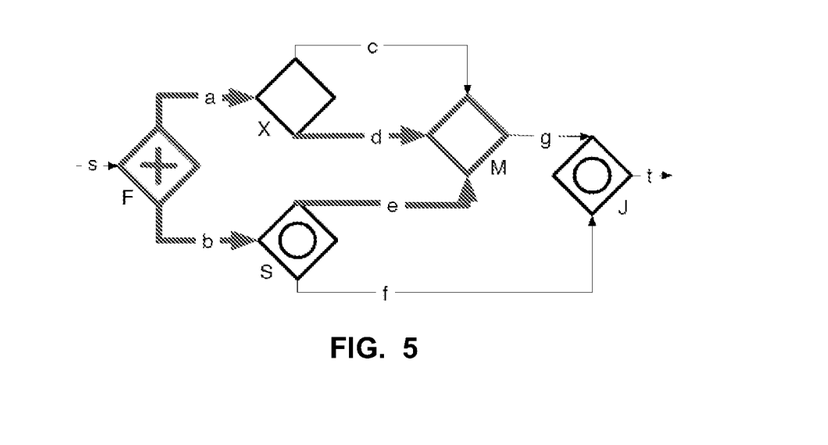
FIG. 5 represents a workflow graph that contains a lack of synchronization.

The workflow graph depicted by FIG. 5 allows the execution $\sigma = \langle$ [s], [a, b], [b, d], [d, e], [e, g], [g, g], ... $\rangle$. The edge g is marked by two tokens in the marking [g, g]. Thus, the workflow graph depicted by FIG. 5 contains a lack of synchronization. In this section, we describe an algorithm which detects lack of synchronizations and sometimes concurrent edges. As said, detecting a lack of synchronization would occur prior to performing the symbolic execution (in embodiments). This approach has quadratic time complexity.

We first give a characterization of lack of synchronization in terms of handles of the graph and then show how handles can be computed in quadratic time. Finally we show how to compute whether two edges are sometimes concurrent, which has separate applications such as data-flow analysis.

4.1 Handles and Lack of Synchronization

To characterize lack of synchronization, we follow the intuition that paths starting with an IOR-split or an AND-split, should not be joined by an XOR-join. In the following, we formalize this characterization and show that such a structure always leads to lack of synchronization in deadlock-free acyclic workflow graphs.

Definition 6 (Path with an AND-XOR or an IOR-XOR Handle).

Let $p_1 = \langle n_0, \ldots, n_i \rangle$ and $p_2 = \langle n_0', \ldots, n_j' \rangle$ be two paths in a workflow graph $W = (N, E, c, l)$.

The paths $p_1$ and $p_2$ form a path with a handle if and only if $p_1$ is not trivial, $p_1 \cap p_2 = \{n_0, n_i\}$, $n_0 = n_j'$, and $n_i = n_0'$. We say that $p_1$ and $p_2$ form a path with an handle from $n_0$ to $n_i$. We speak of a path with a IOR-XOR handle if $n_0$ is an IOR-split and $n_i$ is an XOR-join. We speak of a path with a AND-XOR handle if $n_0$ is an AND-split, and $n_i$ is an XOR join. In the rest of this document, we use handle instead of path with a AND-XOR handle or path with a IOR-XOR handle. The node $n_0$ is the start node of the handle and the node $n_i$ is the end node of the handle.

Note that, strictly speaking, one path is the handle of the other path and vice versa.

Theorem 3.

In an acyclic workflow graph that contains no deadlock, there is a lack of synchronization if and only if there is a handle.

The outline of the only if direction of the proof of theorem 3 is that, whenever there is a handle, this handle can be 'executed' in the sense that there exists an execution such that a token reaches the incoming edge of the start node of the handle and then two tokens can be propagated to reach two incoming edges of the end node of the handle to create a lack of synchronization. We believe that, due to its direct relationship with an erroneous execution, the handle is an adequate error message for the process modeler. In FIG. 5, the handle corresponding to the lack of synchronization is highlighted. We say that the end node of the handle is the location of the lack of synchronization. Note that it is necessary that the workflow graph is deadlock-free in order to show that the handle can be executed and thus a lack of synchronization be observed. However, even if the workflow graph contains a deadlock, a handle is a design error because, once the deadlock is fixed, the handle can be executed and a lack of synchronization can be observed.

The present notion of handles is similar to Esparza and Silva's [13] for Petri nets. If we restrict to workflow graphs without IOR gateways, one of the directions of our characterization follows from a result of Esparza and Silva [13]. The converse direction does not directly follow. The present notion of handles has been described by van der Aalst [14] who shows that, given a Petri net N, the absence of some type of handle in N is a sufficient condition to the existence of an initial marking i of N such that (N, i) is sound. He points out that path with handles can be computed using a maximum flow approach. Various algorithms exist to compute the maximum flow (see [15] for a list). The complexity of these algorithms ranges between $O(|N| \cdot |E|^2)$ and $O(|N| \cdot |E| \cdot \log(|N|))$. The existence of a handle can be checked by applying a maximum flow algorithm to each pair of transition and place of the net. Therefore, the complexity of detecting handles with such an approach is at best $O(|N|^3 \cdot |E| \cdot \log(|N|))$.

4.2 Computing Handles

Given an acyclic directed graph $G = (N, E)$ and four different nodes $s_1, s_2, t_1, t_2 \in N$, Perl and Shiloach [16] show how to detect two node disjoint paths from $s_1$ to $t_1$ and from $s_2$ to $t_2$ in $O(|N| \cdot |E|)$. We extend their algorithm in order to detect two edge disjoint paths between two nodes of an acyclic workflow graph. We sketch our extension here while the details can be found in [17].

Perl and Shiloach [16] describe how to detect two node disjoint paths in a directed graph whereas we want to detect two edge disjoint paths in a workflow graph, a directed multi-graph. To do so, we transform the workflow graph into its line graph [18]. A line graph G' of a graph G represents the adjacency between edges of G. Each edge of G becomes a node of G'. Additionally, we carry over those nodes from G to G' that can be start or end nodes of a handle, i.e., $S = \{x | x \in N \wedge x \text{ is an AND-split or an IOR-split}\}$ and $T = \{x | x \in N \wedge x \text{ is an XOR-join}\}$. The edges of G' are such that the adjacency in G is reflected in G'. For the workflow graph in FIG. 5, we obtain the line graph shown in FIG. 6. The line graph has two node disjoint paths from an AND- or IOR split to an XOR-join if and only if the workflow graph has a handle from that split to that join.

Figure 6:
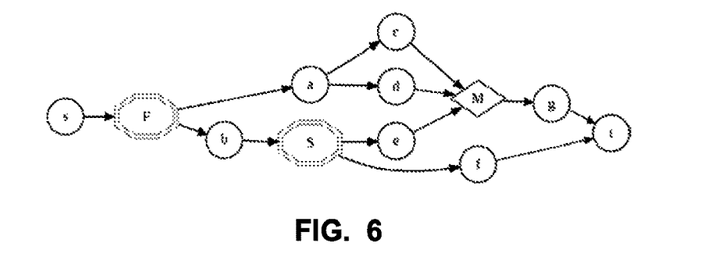
FIG. 6 depicts a line graph for the workflow graph in FIG. 5.

To decide whether there are such two node disjoint paths in the line graph, we can now apply the approach by Perl and Shiloach [16], which is the construction of a graph, that we call state graph. To this end, we extend the partial ordering $<$ of the nodes in the line graph to a total ordering $\prec$. A node of the state graph is pair (n, m) of nodes of the line graph such that $n = m \in S \cup T$ or $n \neq m$ and furthermore $n \prec m$. There is an edge in the state graph from (n, m) to (n', m) (or to (m, n')) if there is an edge from n to n' in the line graph.

Figure 7:
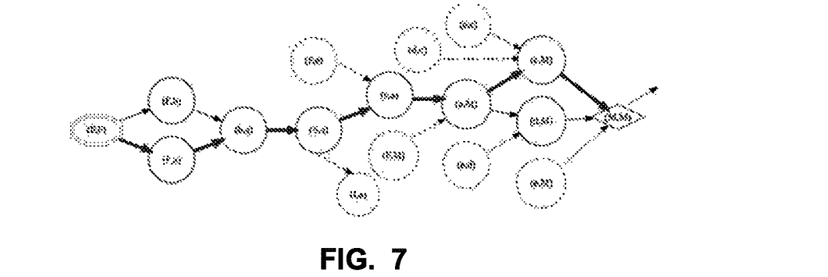
FIG. 7 shows a portion of the state graph for the line graph in FIG. 6.

FIG. 7 depicts a portion of the state graph for the line graph in FIG. 6. We have two node disjoint paths from an AND- or IOR-split s to an XOR-join j in the line graph if and only if there is a path from (s, s) to (j,j) in the state graph. In FIG. 7, one such path is highlighted. The number of edges in the state graph is in $O(|N| \cdot |E|)$ and the number of nodes is in $O(|N|^2)$ in terms of the line graph [16]. The entire algorithm can be implemented to run in quadratic time in the size of the workflow graph, c.f. [17].

4.3. Sometimes Concurrent

A data-flow hazard may arise if two conflicting operations on the same data object are executed concurrently. That can happen only if the tasks containing the data operations are sometimes concurrent. A task of a process is represented as an edge in the corresponding workflow graph. Thus, we are interested in detecting sometimes concurrent edges for data-flow analysis.

Definition 7.

Two edges are sometimes concurrent if there exists an execution in which they are parallel. They are mutually exclusive or never concurrent if they are not sometimes concurrent.

The notion of sometimes concurrent edges is tightly related to lack of synchronization: It follows from the proof of theorem 3 that two incoming edges e, e' of an XOR-join are sometimes concurrent if and only if there is handle to that XOR-join such that one path go through e and the other through e'. To decide whether two arbitrary edges of a sound graph are sometimes concurrent, we show the following:

Lemma 3.

In a sound prefix of the workflow graph W, if two edges $e_1, e_2$ are sometimes concurrent, then $e_1 \| e_2$.

Lemma 3 can be proved by contradiction: Without loss of generality, assume that $e_1 < e_2$. As $e_1$ and $e_2$ are sometimes concurrent, there exists a reachable marking m such that $m[e_1] = m[e_2] = 1$. As there is no deadlock, we can move the token on $e_1$ on the path to $e_2$ until reaching a marking m' such that $m'[e_2] = 2$. The marking m' is a lack of synchronization which is ruled out by the soundness assumption.

We can now determine whether two edges are sometimes concurrent: Let W* be the graph obtained by removing all the elements of the workflow graph that follow either $e_1$ or $e_2$ and add an XOR-join x to be the target of $e_1$ and $e_2$. The edges $e_1$ and $e_2$ are sometimes concurrent if and only if x is the end node of a handle in W. We obtain:

Theorem 4.

It can be decided in quadratic time in the size of a workflow graph whether a given pair of edges is sometimes concurrent.

5 DEALING WITH OVER-APPROXIMATION

In this section, we show how the labeling that is computed in the symbolic execution can be leveraged to deal with errors that are detected in the workflow graph but may not arise in a real execution of the process due to correlation of data-based decisions.

5.1 User Interaction to Deal with Over-Approximation

When we capture the control-flow of a process in a workflow graph, we abstract from the data-based conditions that are evaluated when executing an XOR-split or an IOR-split of the process. Such a data-based decision can be, for example, isGoldCustomer(client). The data-abstraction may result in errors that occur in the workflow graph but not in an actual execution of the process. We use in the following the term actual execution to refer to an execution of the real process as opposed to its workflow graph, which is an abstraction of the process.

Figure 8:
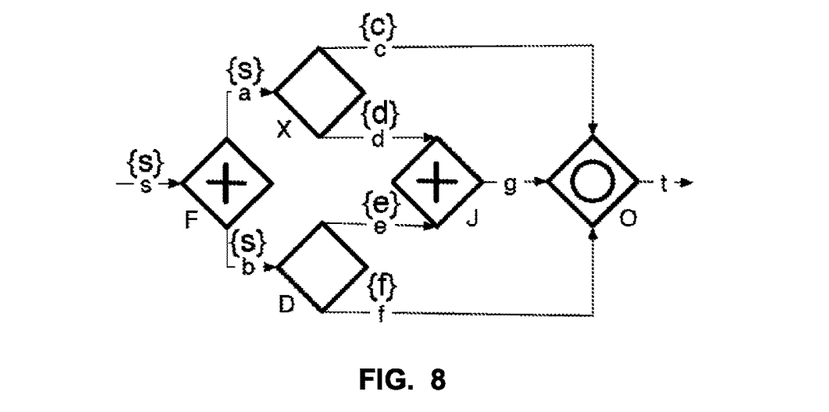
FIG. 8 illustrates a deadlock located (on J) in a graph.

For example, the graph in FIG. 8 contains a deadlock located on J. However, if the data-based decisions in all actual executions are such that outcome d is taken whenever e is taken, this deadlock would never occur in an actual execution. For example, the data-based condition on d could be exactly the same as on e. The user may therefore preferably have the opportunity to inspect the deadlock and decide whether outcomes d and e are related as mentioned above and then dismiss the deadlock. Analysis of the graph should then continue.

To inspect a deadlock, we may provide the AND-join, two incoming edges e, e' of the join, and their non-equivalent labels $\varphi(e)$, $\varphi(e')$ to the user (i.e., identify them visually in the GUI). Then, she may be provided with the possibility to dismiss the deadlock. Technically, this amounts for the user to decide whether for each outcome $o \in \varphi(e)$ and each actual execution where o is taken, there is an outcome $o \in \varphi(e')$ that is also taken in that execution and vice versa. If the user affirms the latter, she can dismiss the deadlock. This basically postulates the equivalence of the two symbols in actual executions. Henceforth, we continue the symbolic execution by treating, internally to the analysis, the AND-join as an IOR-join. Such a possibility offered to the user turns out very efficient in practice.

Figure 9:
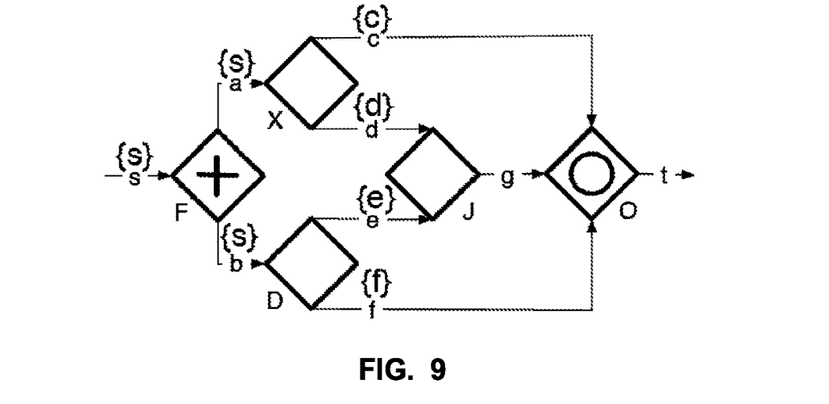
FIG. 9 shows an example of a graph with a lack of synchronization located on J.

To inspect a lack of synchronization, we provide the XOR-join that terminates the detected handle and the two incoming edges e, e' of the XOR-join that are part of the handle to the user. Furthermore, we provide the labels $\varphi(e)$, $\varphi(e')$. Then, the user has to determine that for each pair of outcomes $o \in \varphi(e)$ and $o' \in \varphi(e')$, we have that o is taken in an actual execution implies that o' is not taken in that execution. If the user affirms the latter, she can dismiss the lack of synchronization. This basically postulates that o and o' are mutually exclusive in actual executions. If this is done for all incoming edges of the XOR-join, we can henceforth continue the symbolic execution by treating, internally to the analysis, the XOR-join as an IOR-join. FIG. 9 shows an example with a lack of synchronization located on J. The user may dismiss it because for example, the conditions on e and c are the same.

Figure 10:
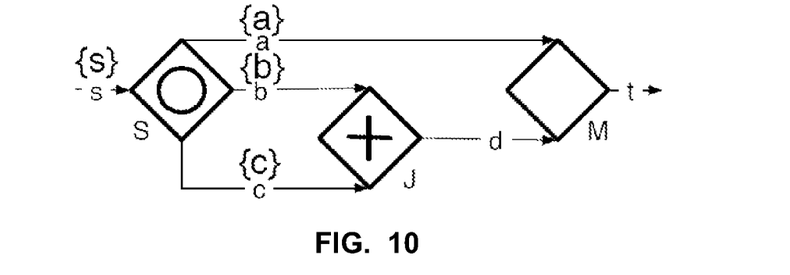
FIG. 10 shows another example of a graph exhibiting both a deadlock and a lack of synchronization.

FIG. 10 shows another example where the deadlock can be dismissed if b and c are deemed to be equivalent. Once the user dismissed the deadlock, we continue the symbolic execution and label the edge d with the symbol {b, c} according to the IOR-join propagation rule, see FIG. 3. To dismiss the lack of synchronization at M, the user then has to check the pair a, b and the pair a, c for mutual exclusion.

For our running example, the deadlock displayed on FIG. 4, can be dismissed if g is equivalent to s, i.e., g is deemed to be marked in every execution of the process.

Note that, if we provided an execution, i.e., an error trace, rather than the symbolic information to dismiss an error, we would present exponentially many executions that contain the same error in the worst case. The analysis of the outcome sets precisely gives the conditions under which one deadlock or one lack of synchronization occurs. It does not contain information that is irrelevant for producing the error.

5.2 Relaxed Soundness

Figure 11:
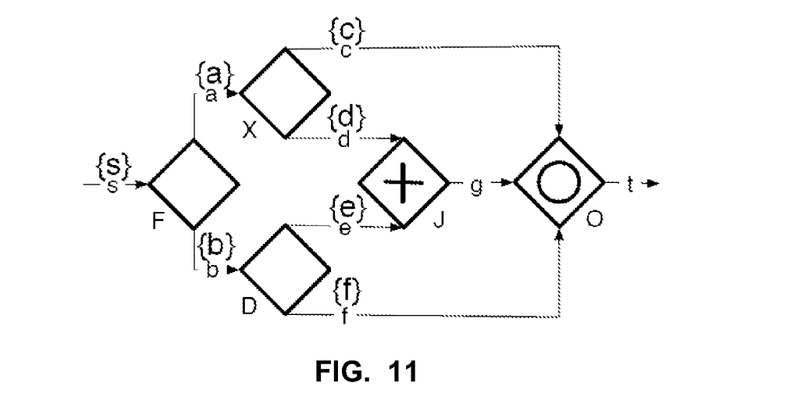
FIG. 11 depicts a deadlock in a graph that should not be dismissed, in an embodiment.

Notwithstanding the interaction offered to the user, embodiments of the invention may be provided, which ensure that, at least in some cases, the user is not allowed to dismiss an error. For example, FIG. 11 shows a deadlock that cannot be avoided unless d and e are never taken which clearly indicates a modeling error. It can be realized that such a situation is related to the notion of relaxed soundness [10]. A workflow graph is relaxed sound if for every edge e, there is a sound execution that marks e, where an execution is sound if it neither reaches a deadlock nor a lack of synchronization. The graph in FIG. 11 is not relaxed sound. We do not know any polynomial-time algorithm to decide relaxed soundness for acyclic workflow graphs. However, we provide here necessary conditions for relaxed soundness that can be checked in polynomial time.

One necessary condition for relaxed soundness is that for every AND-join j and every pair of incoming edges e, e' of j, e and e' are sometimes concurrent. Likewise, for every XOR-join j and every pair of incoming edges e, e' of j, e and e' must not be always concurrent. Moreover, we have the following stronger necessary conditions:

Theorem 5.

Let W be an acyclic workflow graph. If for an AND-join j, and a pair of incoming edges e, e' of j and one outcome $o \in \varphi(e)$, we have that all outcomes $o' \in \varphi(e')$ are mutually exclusive with o, then W is not relaxed sound. If for an XOR-join j, and a pair of incoming edges e, e' of j, we have $\overline{\varphi}(e) \cap \overline{\varphi}(e') \neq \emptyset$, then W is not relaxed sound.

Figure 12:
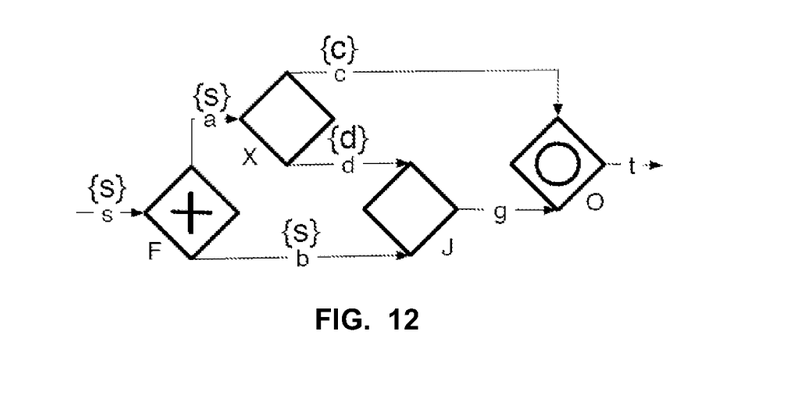
FIG. 12 shows a lack of synchronization that should not be dismissed, in an embodiment.

Based on the results above, we can compute these necessary conditions for relaxed soundness in polynomial time. If one of them is true the corresponding error should not be dismissible. For example, the deadlock in the workflow graph depicted by FIG. 11 cannot be dismissed because d and e are mutually exclusive. The lack of synchronization located on J in the workflow graph depicted by FIG. 12 cannot be dismissed because $\overline{\varphi}(d) = \{d\}$ and $\overline{\varphi}(d) = \{s,c,d\}$ and thus $\overline{\varphi}(e) \cap \overline{\varphi}(e') \neq \emptyset$.

Note that, deciding soundness and relaxed soundness complement each other. Using relaxed soundness, we would not detect the deadlock that may be present in an actual execution of FIG. 8, for example.

6 CONCLUSION

To summarize, we have shown how basic relationships between control-flow edges of a process can be decided in polynomial time for acyclic workflow graphs with inclusive OR gateways, in embodiments. This has various applications, for example, to detect control-flow errors, to perform data-flow analysis, or to compare processes at a behavioral level. Moreover, we have proposed an embodiment of control-flow analysis that decides soundness in quadratic time and gives concise error information that precisely characterizes a single error. We further outlined how the diagnostic information can be used to efficiently dismiss spurious errors that may not occur in actual executions of the process due to correlated data-based decisions.

Note that, to increase the applicability of this approach, we can combine it with workflow graph parsing using the Refined Process Structure Tree [19], which allows for decomposing the workflow graph into fragments and to analyze each fragment in isolation (see [6] for details). Thus, our approach can be used to analyze every acyclic fragment of a cyclic workflow graph. However, it has to be worked out how the user interaction proposed in Sect. 5 can be extended to that class. Some cyclic fragments can be analyzed using suitable heuristics [20] which can be applied in linear time. In addition, Kovalyov and Esparza describe an approach that could be used to detect sometimes concurrent edges in a sound workflow graph without IOR logic in cubic time [21].

While the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiment disclosed, but that the present invention will include all embodiments falling within the scope of the appended claims. For example, at least some aspects of the symbolic execution as introduced above can be contemplated to be extended to cyclic workflow graphs.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to illustrations. Embodiments of the method recited above can be implemented by computer program instructions, e.g., corresponding to steps, substeps, functions, or combinations thereof. These computer program instructions may be provided to a processor of a general purpose computer, special purpose computer, or other programmable data processing apparatus to produce a machine, such that the instructions, which execute via the processor of the computer or other programmable data processing apparatus, create means for implementing the said embodiments.

These computer program instructions may also be stored in a computer readable medium that can direct a computer, other programmable data processing apparatus, or other devices to function in a particular manner, such that the instructions stored in the computer readable medium produce an article of manufacture, e.g., including such instructions.

The computer program instructions may also be loaded onto a computer, other programmable data processing apparatus, or other devices to cause a series of operational steps to be performed on the computer, other programmable apparatus or other devices to produce a computer implemented process such that the instructions execute on the computer or other programmable apparatus.

REFERENCES

1. J. Mendling, "Empirical Studies in Process Model Verification," *T. Petri Nets and Other Models of Concurrency (ToPNoC)*, vol. 2, pp. 208-224, 2009.
2. M. Weidlich, J. Mendling, and M. Weske, "Computation of Behavioural Profiles of Processes Models," tech. rep.
3. M. Weidlich, A. Polyvyanyy, J. Mendling, and M. Weske, "Efficient Computation of Causal Behavioural Profiles using Structural Decomposition," tech. rep.

4. J. Desel and J. Esparza, *Free choice Petri nets*, vol. 40 of *Cambridge tracts in theoretical computer science*. Cambridge: Cambridge University Press, 1995.
5. J. Esparza, "Reduction and synthesis of live and bounded free choice Petri nets," *Information and Computation*, vol. 114, pp. 50-87, October 1994.
6. D. Fahland, C. Favre, B. Jobstmann, J. Koehler, N. Lohmann, H. Völzer, and K. Wolf, "Instantaneous soundness checking of industrial business process models," in *BPM*, p. 293, Springer, 2009.
7. W. Sadiq and M. E. Orlowska, "Analyzing process models using graph reduction techniques," *Inf. Syst*, vol. 25, no. 2, pp. 117-134, 2000.
8. J. Mendling, *Detection and Prediction of Errors in EPC Business Process Models*. PhD thesis, Vienna University of Economics and Business Administration, Vienna, Austria, 2007.
9. M. Wynn, H. Verbeek, W. Aalst, A. Hofstede, and D. Edmond, "Business process verification—finally a reality!," *Business Process Management Journal*, vol. 15, no. 1, pp. 74-92, 2009.
10. J. Dehnert and P. Rittgen, "Relaxed soundness of business processes," in *CAiSE*, vol. 2068, pp. 157-170, Springer, 2001.
11. A. Martens, "On compatibility of web services," *Petri Net Newsletter*, vol. 65, pp. 12-20, 2003.
12. H. Völzer, "A new semantics for the inclusive converging gateway in safe processes." Submitted to BPM 2010.
13. J. Esparza and M. Silva, "Circuits, handles, bridges and nets," *Advances in Petri nets*, vol. 483, pp. 210-242, 1990.
14. W. van der Aalst, "Workflow verification: Finding control-flow errors using Petri-net-based techniques," *Lecture Notes in Computer Science*, pp. 161-183, 2000.
15. A. V. Goldberg and R. E. Tarjan, "A new approach to the maximum-flow problem," *J. ACM*, vol. 35, no. 4, pp. 921-940, 1988.
16. Y. Perl and Y. Shiloach, "Finding two disjoint paths between two pairs of vertices in a graph," *J. Assoc. Comput. Mach*, vol. 25, no. 1, p. 9, 1978.
17. C. Favre, "An efficient approach to detect lack of synchronizations in acyclic workflow graphs." To appear in proceedings of ZEUS 2010, available at http://www-.zurich.ibm.com/ced/Favre_ZEUS_2010.pdf.
18. F. Harary, "Graph Theory," 1969. 19. J. Vanhatalo, H. Völzer, and J. Koehler, "The refined process structure tree," in BPM-08, vol. 5240, pp. 100-115, Springer, 2008.
20. J. Vanhatalo, *Process Structure Trees: Decomposing a Business Process Model into a Hierarchy of Single-Entry-Single-Exit Fragments*. PhD thesis, Universitat Stuttgart, 2009.
21. A. Kovalyov and J. Esparza, "A polynomial algorithm to compute the concurrency relation of free-choice Signal Transition Graphs", In Proc. of the International Workshop on Discrete Event Systems (WODES), 1996.

The invention claimed is:

1. A computer-implemented method for overcoming a detected deadlock in actual execution of a business process by analyzing a control-flow in the business process; the method comprising the steps of:
generating, using a computing device, a graphical representation of the business process as an acyclic workflow graph containing AND-, XOR- and IOR-types of nodes and edges linking nodes of the graph;
labeling, using the computing device, edges of the graph such that a label assigned to a first edge comprises a set of one or more edge identifiers identifying respective edges, each of the edges identified being an outgoing edge of an XOR-split or an IOR-split node in the graph, whereby executing any one of the identified edges ensures that the first edge will be executed;
checking, using the computing device, the labels for a deadlock, while labeling;
providing, using the computing device, a user-perceptible indication of whether the deadlock exists responsive to a result of said checking step; and
reducing computational resources used by the computing device for detection of the deadlock by receiving and executing computer program code modifications for eliminating the deadlock in a single traversal through the graph and completing program execution when the deadlock is detected,
the eliminating the deadlock in a single traversal through the graph limiting the method to a quadratic time complexity, and providing the user-perceptible indication in quadratic time.

2. The method of claim 1, wherein the graph has a unique source edge with a predefined label comprising a unique edge identifier identifying the source edge, and wherein labeling is initiated from the source edge.

3. The method of claim 1, wherein the step of labeling further comprises propagating the labeling by labeling outgoing edges of the nodes of the graph with respective outgoing labels according to incoming labels of respective incoming edges of the nodes.

4. The method of claim 1, wherein, at the step of labeling, a label of an outgoing edge of an XOR-split node or an IOR-split node of the graph contains only one edge identifier of the said outgoing edge.

5. The method of claim 1, wherein the step of labeling is performed by applying, for each node, a propagation function in accordance with the type of the said each node.

6. The method of claim 1, wherein the step of labeling is further performed such that:
if the graph is deadlock free, then two labels of respective two incoming edges of an AND-join node of the graph are equivalent; and
if two labels of respective two incoming edges of an AND-join node of the graph are non-equivalent, then the graph has a deadlock,
and wherein the step of checking further comprises checking the incoming labels of the AND-join node for a deadlock.

7. The method of claim 6,
wherein if a deadlock is detected at the step of checking, said indicating step comprises returning to a user a characterization indicative of the detected deadlock via a graphical user interface (GUI).

8. The method of claim 7, further comprising, after returning the characterization indicative of the detected deadlock, a step of:
upon receiving user instruction to dismiss a detected deadlock, continuing the labeling by considering:
the labels of respective two incoming edges of the AND-join node corresponding to the detected deadlock as equivalent; and
the AND-join node corresponding to the detected deadlock as an inclusive OR-join node.

9. The method of claim 7, wherein the characterization indicative of the detected deadlock is returned to the user by graphically identifying in the GUI (4T)-the AND-join node corresponding to the detected deadlock, two incoming edges thereof and their respective labels.

10. The method of claim 7, wherein the acyclic workflow graph and the labels of the edges as obtained during the labeling step are graphically represented in the GUI.

11. The method of claim 1, further comprising, prior to labeling, a step of detecting a lack of synchronization in the acyclic workflow graph.

12. The method of claim 1, wherein the step of labeling is performed based on a maximum prefix of the acyclic workflow graph that does not contain a lack of synchronization.

13. The method of claim 1, wherein labeling is performed by a single traversal of the graph.

* * * * *